United States Patent
Fujishima et al.

(10) Patent No.: US 9,304,445 B2
(45) Date of Patent: Apr. 5, 2016

(54) DEVELOPING ROLLER, DEVELOPING DEVICE, IMAGE FORMING APPARATUS, AND MANUFACTURING METHOD OF DEVELOPING ROLLER

(71) Applicant: KYOCERA Document Solutions Inc., Osaka-shi, Osaka (JP)

(72) Inventors: Masashi Fujishima, Osaka (JP); Yuji Kamiyama, Osaka (JP); Tamotsu Shimizu, Osaka (JP); Shizuka Okada, Osaka (JP); Sakae Saito, Osaka (JP); Yasuhiro Oishi, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/574,266

(22) Filed: Dec. 17, 2014

(65) Prior Publication Data

US 2015/0177651 A1 Jun. 25, 2015

(30) Foreign Application Priority Data

Dec. 20, 2013 (JP) ................. 2013-264425

(51) Int. Cl.
*G03G 15/09* (2006.01)
*G03G 15/08* (2006.01)
*C23C 28/00* (2006.01)
*C25D 11/18* (2006.01)
*C25D 9/06* (2006.01)

(52) U.S. Cl.
CPC .............. *G03G 15/09* (2013.01); *C23C 28/00* (2013.01); *C25D 9/06* (2013.01); *C25D 11/18* (2013.01); *G03G 15/0808* (2013.01); *G03G 15/0818* (2013.01); *G03G 15/0928* (2013.01)

(58) Field of Classification Search
CPC G03G 15/09; G03G 15/0808; G03G 15/0928
USPC .................................. 399/265, 276, 279, 286
See application file for complete search history.

(56) References Cited

U.S. PATENT DOCUMENTS 8,010,025 B2 * 8/2011 Hamakawa et al. .......... 399/286

FOREIGN PATENT DOCUMENTS

JP 2011164125 A 8/2011
JP 2012047876 A 3/2012

* cited by examiner

*Primary Examiner* — Hoang Ngo
(74) *Attorney, Agent, or Firm* — Alleman Hall McCoy Russell & Tuttle LLP

(57) ABSTRACT

A developing roller includes a roller main body disposed to face, without contact, an outer circumferential surface of an image carrier. The roller main body includes an aluminum oxide thin film and a resin coat layer, the aluminum oxide thin film being formed on an outer circumferential surface of a base body that is made of a metal including aluminum, the resin coat layer being formed on a surface of the aluminum oxide thin film that has been subjected to a predetermined heating process, the resin coat layer being made of a resin material and having electric conductivity.

8 Claims, 5 Drawing Sheets

FIG. 5

| | BASE LAYER | TITANIUM OXIDE TYPE | TITANIUM OXIDE PTS.WT. | RESIN COAT TYPE | RESIN COAT μm | Ra μm | SURFACE RESISTANCE Rx[Ω] | RESISTANCE RATIO Ry/Rx | VARIATION IN LEAK-GENERATION VOLTAGES | IMAGE DENSITY IN LL ENVIRONMENT |
|---|---|---|---|---|---|---|---|---|---|---|
| CF1 | ALUMITE | ET300W+CB | | URETHANE | — | 0.34 | 5.76E+07 | 2.91E-04 | × | ○ |
| CF2 | ALUMITE | ET300W+CB | | URETHANE | — | 0.37 | 9.73E+06 | 4.91E-05 | × | ○ |
| CF3 | ALUMITE | ET300W | 5 | NYLON | 2.0 | 0.36 | 6.28E+12 | 3.17E+01 | ○ | × |
| EX1 | ALUMITE | ET300W | 125 | NYLON | 3.6 | 0.26 | 9.30E+09 | 4.70E-02 | △ | ○ |
| EX2 | ALUMITE | ET300W | 100 | NYLON | 2 | 0.28 | 1.04E+10 | 5.25E-02 | △ | ○ |
| EX3 | ALUMITE | ET300W | 50 | NYLON | 2 | 0.28 | 9.46E+10 | 4.78E-01 | △ | ○ |
| EX4 | ALUMITE | ET300W | 50 | NYLON | 6 | 0.23 | 6.20E+11 | 3.13E+00 | ○ | ○ |
| EX5 | ALUMITE | ET300W | 50 | NYLON | 2.26 | 0.20 | 2.66E+11 | 1.34E-01 | △ | ○ |
| EX6 | ALUMITE | ET300W | 100 | NYLON | 2.21 | 0.18 | 3.41E+09 | 1.72E-02 | △ | ○ |
| EX7 | ALUMITE | ET300W | 50 | NYLON | 5.63 | 0.13 | 1.38E+11 | 6.97E-01 | △ | ○ |
| EX8 | ALUMITE | ET300W | 50 | NYLON | 7.18 | 0.14 | 1.99E+11 | 1.01E+00 | ○ | ○ |
| EX9 | ALUMITE | ET300W | 100 | NYLON | 6.08 | 0.16 | 6.67E+08 | 3.37E-03 | △ | ○ |
| EX10 | ALUMITE | SMT-A | 50 | NYLON | 1.7 | 0.26 | 1.98E+11 | 1.00E+00 | ○ | ○ |
| EX11 | ALUMITE | SMT-A | 50 | NYLON | 5.8 | 0.16 | 2.10E+12 | 1.06E+01 | ○ | ○ |
| EX12 | ALUMITE | SMT-A | 50 | NYLON | 7.4 | 0.15 | 3.33E+12 | 1.68E+01 | ○ | ○ |
| EX13 | ALUMITE | SMT-A | 100 | NYLON | 4.4 | 0.16 | 2.78E+11 | 1.40E+00 | ○ | ○ |
| EX14 | ALUMITE | SMT-A | 100 | NYLON | 7.6 | 0.19 | 2.30E+12 | 1.16E+01 | ○ | ○ |
| EX15 | ALUMITE | SMT-A | 150 | NYLON | 5 | 0.17 | 6.20E+11 | 3.13E+00 | ○ | ○ |
| EX16 | ALUMITE | SMT-A | 150 | NYLON | 8.1 | 0.20 | 1.72E+12 | 8.69E+00 | ○ | ○ | ies DEVELOPING ROLLER, DEVELOPING
DEVICE, IMAGE FORMING APPARATUS,
AND MANUFACTURING METHOD OF
DEVELOPING ROLLER

INCORPORATION BY REFERENCE

This application is based upon and claims the benefit of priority from the corresponding Japanese Patent Application No. 2013-264425 filed on Dec. 20, 2013, the entire contents of which are incorporated herein by reference.

BACKGROUND

The present disclosure relates to a technology of a developing roller that is disposed to face, without contact, the outer circumferential surface of the image carrier.

A developing device is installed in an image forming apparatus which is a copier, a printer or the like and forms an image on a paper sheet based on the electrophotography. The developing device develops, by toner, an electrostatic latent image formed on an image carrier such as a photoconductor drum. As the developing method, a so-called two-component developing method is known which uses two-component developer including magnetic carrier and toner to develop a toner image on the image carrier. As an example of the two-component developing method, there is conventionally known a contactless developing system called "interactive touchdown developing system". In the interactive touchdown developing system, a developing roller and a magnetic roller are used. The developing roller is disposed at a predetermined distance from the image carrier. A magnet is embedded in the magnetic roller. The magnetic roller draws up the magnetic carrier as well as the toner, and holds them on the surface thereof. The magnetic roller forms a magnetic brush thereon to transfer only the toner to the developing roller, and form a toner thin layer on the developing roller. An AC electric field is generated by a developing bias that includes an AC component applied to the developing roller, and the AC electric field flies the toner from the developing roller and causes the toner to adhere to the electrostatic latent image on the image carrier.

There is known a developing roller used in this type of developing device, wherein in the developing roller, a base body made of aluminum is coated with an alumite layer, and the alumite layer is coated with a resin coat layer that is electrically conductive. The electrical conductivity of the resin coat layer is realized by mixing a conductive agent, such as titanium oxide, with a resin material that is highly insulating. It is noted that the alumite layer plays a role in suppressing a leak from occuring between the image carrier and the developing roller.

SUMMARY

A developing roller according to an aspect of the present disclosure includes a roller main body disposed to face, without contact, an outer circumferential surface of an image carrier. The roller main body includes an aluminum oxide thin film and a resin coat layer, the aluminum oxide thin film being formed on an outer circumferential surface of a base body that is made of a metal including aluminum, the resin coat layer being formed on a surface of the aluminum oxide thin film that has been subjected to a predetermined heating process, the resin coat layer being made of a resin material and having electric conductivity.

A developing device according to another aspect of the present disclosure includes the developing roller and a magnetic roller. The magnetic roller is configured to form a toner layer on a surface of the developing roller via a magnetic brush composed of toner and magnetic carrier. It is noted that the toner layer is formed on the surface of the magnetic roller via the magnetic brush, by applying a voltage to between the developing roller and the magnetic roller.

An image forming apparatus according to a further aspect of the present disclosure includes the developing device.

A manufacturing method of a developing roller according to a still further aspect of the present disclosure includes the following steps. In a first step, an aluminum oxide thin film is formed, by an anodic oxidation processing, on an outer circumferential surface of a base body that is made of a metal including aluminum. In a second step, a heating process is performed on a surface of the aluminum oxide thin film. In a third step, a resin coat layer is formed, by a dipping method, on the surface of the aluminum oxide thin film after the heating process, the resin coat layer being made of a resin material and having electric conductivity.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a table showing comparative examples 1 to 3 (CF1-3) and examples 1 to 16 (EX1-16) pertaining to the developing sleeve.

DETAILED DESCRIPTION

The following describes embodiments of the present disclosure with reference to the drawings as appropriate. It should be noted that the following embodiments are only examples of specific embodiments of the present disclosure and can be varied as appropriate without changing the gist of the present disclosure.

Figure 1:
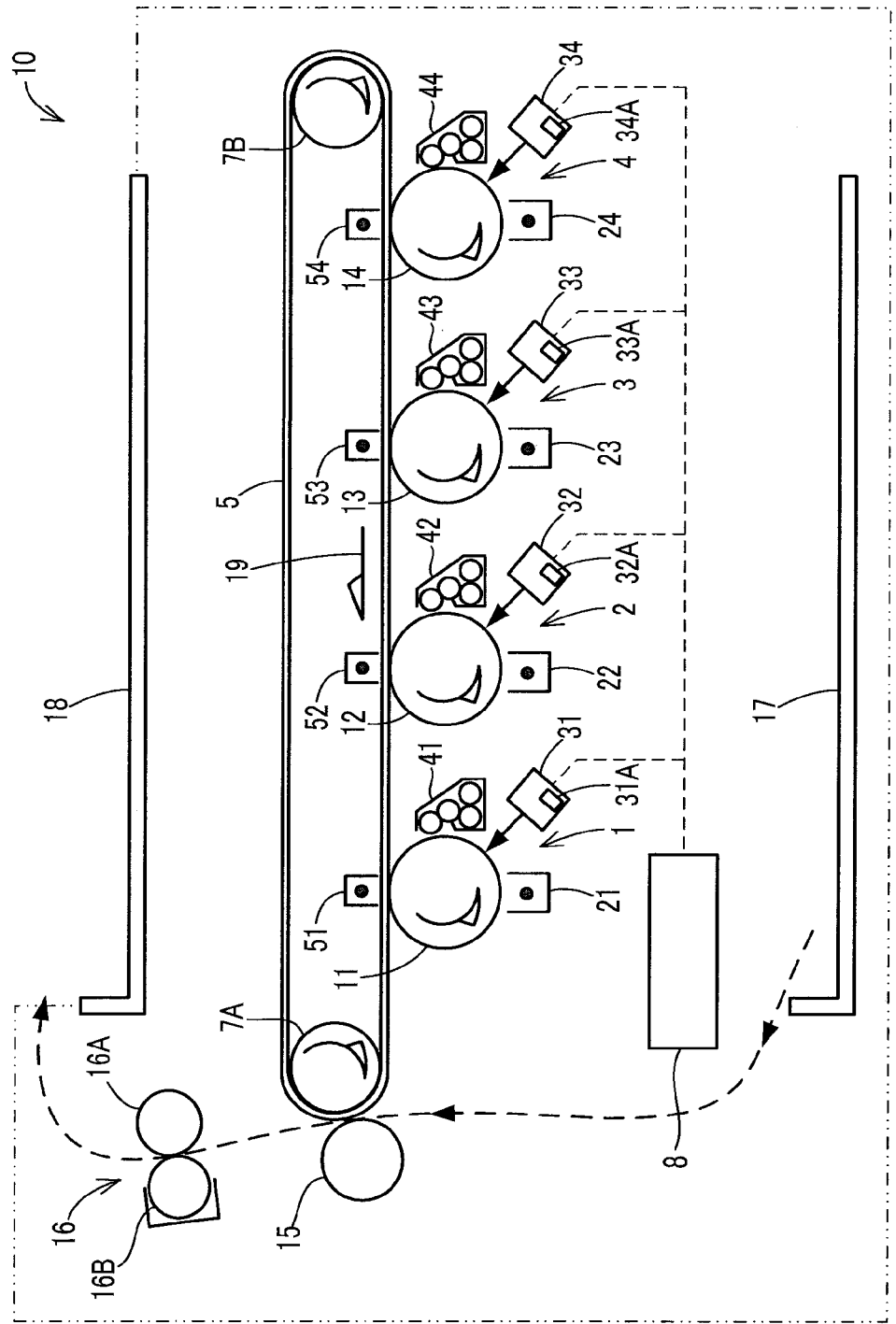
FIG. 1 is a schematic diagram showing the configuration of the image forming apparatus in an embodiment of the present disclosure.

FIG. 1 is a schematic diagram showing an outlined configuration of an image forming apparatus 10 (an example of the image forming apparatus of the present disclosure) in an embodiment of the present disclosure. As shown in FIG. 1, the image forming apparatus 10 is a so-called tandem color image forming apparatus, and includes a plurality of image forming portions 1-4, an intermediate transfer belt 5, a driving roller 7A, a driven roller 7B, a secondary transfer device 15, a fixing device 16, a control portion 8, a sheet feed tray 17, and a sheet discharge tray 18. It is noted that specific examples of the image forming apparatus 10 in an embodiment of the present disclosure are a copier, a facsimile, a printer that can form a color image or a monochrome image, and a multifunction peripheral having these functions.

The image forming portions 1-4 form images based on the electrophotography. The image forming portions 1-4 form toner images of different colors respectively on a plurality of photoconductor drums 11-14 arranged in an alignment (an example of the image carrier of the present disclosure), and transfer the toner images onto the intermediate transfer belt 5 in sequence while the intermediate transfer belt 5 is running (moving) so that the images are overlaid with each other. In an example shown in FIG. 1, in order from the downstream side in the movement direction (the direction indicated by arrow 19) of the intermediate transfer belt 5, an image forming portion 1 for black, an image forming portion 2 for yellow, an image forming portion 3 for cyan, and an image forming portion 4 for magenta are arranged in a row in the stated order.

The image forming portions 1-4 include the photoconductor drums 11-14, charging devices 21-24, exposure devices 31-34, developing devices 41-44 (an example of the developing device of the present disclosure), first transfer devices 51-54 and the like, respectively. The photoconductor drums 11-14 carry toner images on the surfaces thereof. The charging devices 21-24 charge the surfaces of the corresponding photoconductor drums 11-14 to a predetermined potential. The exposure devices 31-34 form electrostatic latent images on the charged surfaces of the photoconductor drums 11-14 by exposing the surfaces to light that is scanned thereon. The developing devices 41-44 develop the electrostatic latent images on the photoconductor drums 11-14 by toner. The first transfer devices 51-54 transfer the toner images from the rotating photoconductor drums 11-14 onto the intermediate transfer belt 5. It is noted that although not shown in FIG. 1, the image forming apparatuses 1-4 also include cleaning devices for removing remaining toner from the surfaces of the photoconductor drums 11-14.

The intermediate transfer belt 5 is, for example, a belt having a shape of an endless loop and is made of rubber, urethane or the like. The intermediate transfer belt 5 is supported by the driving roller 7A and the driven roller 7B so as to be driven and rotated. The driving roller 7A is located close to the fixing device 16 (on the left side in FIG. 1), and the driven roller 7B is located away from the fixing device 16 (on the right side in FIG. 1). The surface of the driving roller 7A is made of, for example, a material such as rubber, urethane or the like that increases friction force with the intermediate transfer belt 5. By being supported by the driving roller 7A and the driven roller 7B, the intermediate transfer belt 5 moves (runs), with its surface contacting with the surfaces of the photoconductor drums 11-14. When the intermediate transfer belt 5 passes between the photoconductor drums 11-14 and the first transfer devices 51-54, the toner images are transferred in sequence from the photoconductor drums 11-14 onto the surface of the intermediate transfer belt 5 so that the images are overlaid with each other.

The second transfer device 15 transfers the toner image from the intermediate transfer belt 5 to a print sheet conveyed from the paper feed tray 17. The print sheet with the transferred toner image thereon is conveyed to the fixing device 16 by a conveyance device (not shown). The fixing device 16 includes a heating roller 16A heated to a high temperature and a pressure roller 16B disposed to face the heating roller 16A. The print sheet conveyed to the fixing device 16 is conveyed while being nipped by the heating roller 16A and the pressure roller 16B. This allows the toner image to be fused and fixed to the print sheet. The print sheet is then ejected onto the ejected paper tray 18.

As described above, the image forming apparatus 10 forms a color toner image on the surface of the intermediate transfer belt 5 by causing the plurality of image forming portions 1-4 to transfer toner images of different colors onto the intermediate transfer belt 5 while the belt is running so that the toner images are overlaid with each other. The color toner image is transferred by the second transfer device 15 from the intermediate transfer belt 5 to a print sheet. With this operation, a color image is formed on the print sheet. Note that, as another embodiment, the intermediate transfer belt 5 may be used as a conveyance belt, and the toner images may be overlaid directly on a print sheet that is conveyed on the conveyance belt. Also, as a still another embodiment, an intermediate transfer member shaped like a roller may be used in place of the intermediate transfer belt 5.

The control portion 8 comprehensively controls the image forming apparatus 10. The control portion 8 includes a CPU, a ROM, a RAM, an EEPROM, a motor driver, and the like. The RAM is a volatile storage medium, and the EEPROM is a nonvolatile storage medium. The RAM and the EEPROM are used as temporary storage memories for the various types of processes executed by the CPU. The motor driver drives and controls motors (not shown) for various purposes based on control signals from the CPU.

Figure 2:
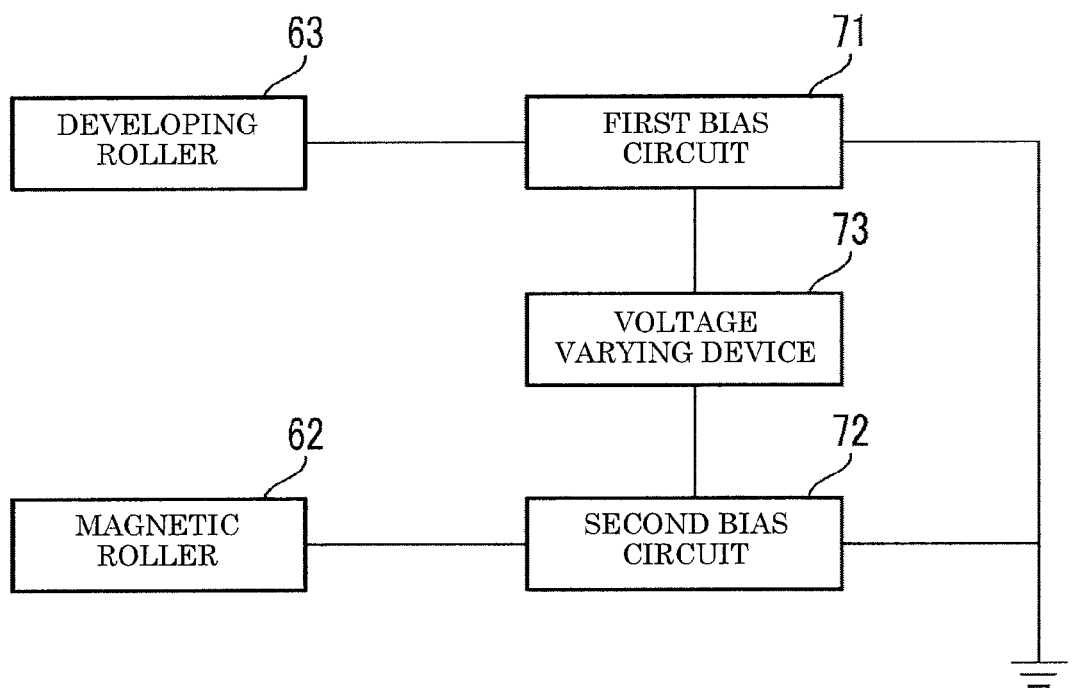
FIG. 2 is a block diagram showing the configuration of the control portion included in the image forming apparatus of FIG. 1.

As shown in FIG. 2, the control portion 8 includes a first bias circuit 71, a second bias circuit 72, and a voltage varying device 73. The first bias circuit 71 applies a voltage to a developing roller 63 which is included in each of the developing devices 41-44 (see FIG. 3). The second bias circuit 72 applies a voltage to a magnetic roller 62 which is included in each of the developing devices 41-44 (see FIG. 3). The voltage varying device 73 varies the voltages applied to the developing roller 63 and the magnetic roller 62.

Figure 3:
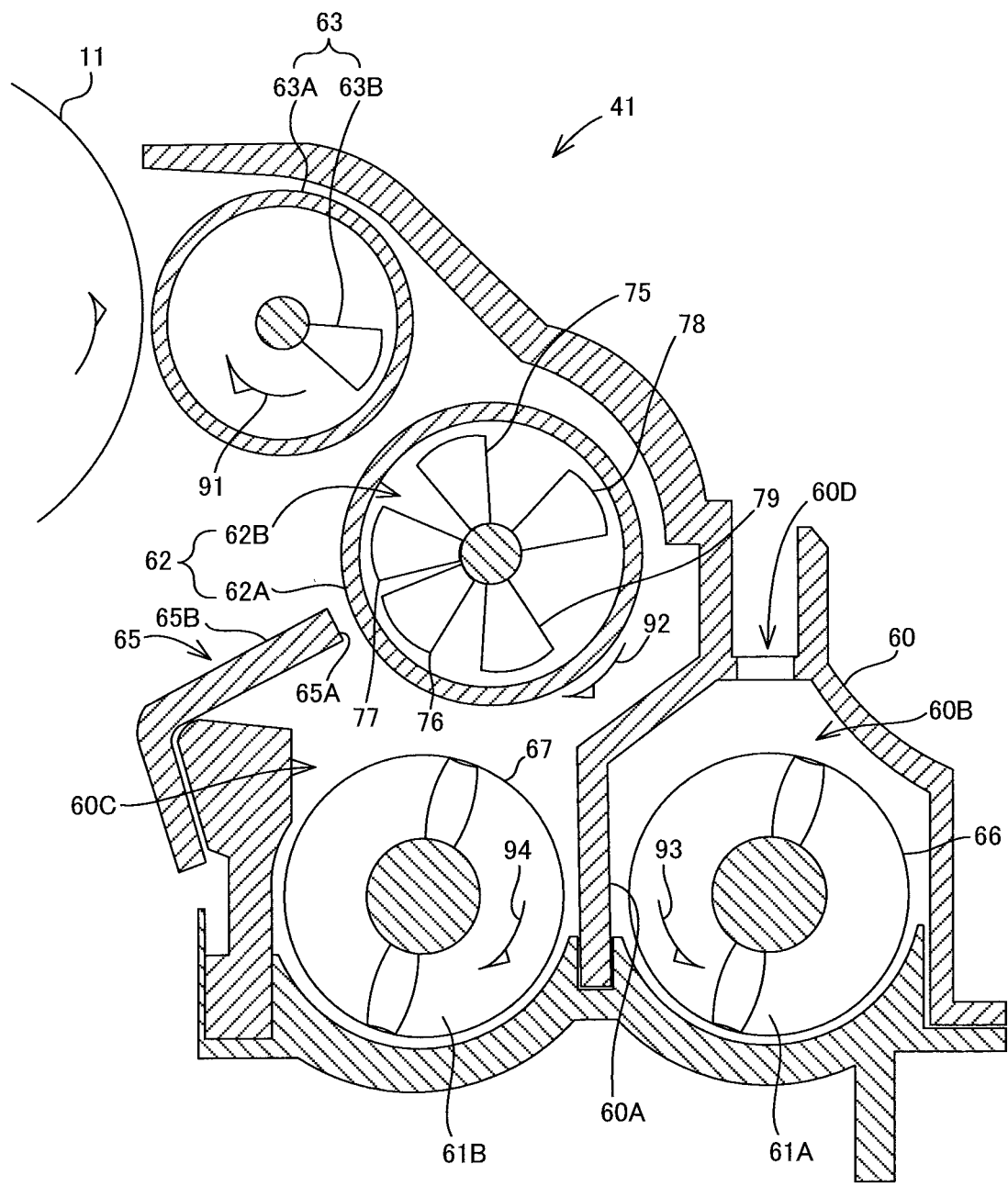
FIG. 3 is a cross sectional view showing the configuration of the developing device in an embodiment of the present disclosure.

FIG. 3 is a cross-sectional diagram showing the configuration of the developing device 41 included in the image forming portion 1. The following explains the configuration of the developing device 41 with reference to FIG. 3. It is noted that the other developing devices 42-44 have the same configuration as the developing device 41, and detailed description thereof is omitted.

The developing device 41 develops images by a developing system called "interactive touchdown developing system" which causes toner to be adhered to the electrostatic latent image while the developing device is not contacting the photoconductor drum 11. As shown in FIG. 3, the developing device 41 includes a developer case 60 in which two-component developer (hereinafter, may be merely referred to as "developer") including toner is stored. The developer container 60 is partitioned into a first stirring chamber 60B and a second stirring chamber 60C by a partition wall 60A. The developer is stored in both the first stirring chamber 60B and the second stirring chamber 60C. In the first stirring chamber 60B and the second stirring chamber 60C, the first stirring screw 61A and the second stirring screw 61B are rotatably provided, respectively. The toner is supplied from a toner container (not shown) to the developer case 60, and the first stirring screw 61A and the second stirring screw 61B mix the toner with magnetic carrier, stir them, and electrically charge the toner.

The magnetic roller 62 and the developing roller 63 (an example of the developing roller of the present disclosure) are provided in the developer container 60. The magnetic roller 62 holds, on its roller surface, the magnetic carrier adhered with the toner. The magnetic roller 62 forms a toner layer on the surface of the developing roller 63 via a magnetic brush, which, as described below, is composed of the magnetic carrier adhered with the toner. The developing roller 63 is disposed to face the magnetic roller 62. Specifically, the magnetic roller 62 is disposed above the second stirring screw 61B. The developing roller 63 is disposed at the upper left of the magnetic roller 62 to face the magnetic roller 62 with a predetermined gap therebetween. In addition, the developing roller 63 faces the photoconductor drum 11 at an opening 64 of the developer container 60 (at left in FIG. 3) with a predetermined gap therebetween. That is, the developing roller 63 is disposed to face the outer circumferential surface of the photoconductor drum 11. The magnetic roller 62 and the developing roller 63 are both rotated clockwise in FIG. 3 (see arrows 91, 92).

The magnetic roller 62 includes a non-magnetic rotating sleeve 62A and a magnetic-roller-side magnetic pole 62B that includes a plurality of magnetic poles. The rotating sleeve 62A is rotatably supported by a frame (not shown) of the developing device 41. The magnetic-roller-side magnetic pole 62B is contained in the rotating sleeve 62A. That is, the magnetic-roller-side magnetic pole 62B is provided inside the rotating sleeve 62A. The magnetic-roller-side magnetic pole 62B is fixed inside the rotating sleeve 62A. In the present embodiment, the magnetic-roller-side magnetic pole 62B has five magnetic poles: a main pole 75; a regulation pole (a brush-clipping magnetic pole) 76; a carrying pole 77; a peeling pole 78; and a draw-up pole 79. The magnetic poles 75-79 may be, for example, permanent magnets that generate magnetic forces.

The main pole 75 is attached to the magnetic-roller-side magnetic pole 62B in the state where the magnetic pole face of the main pole 75 faces the developing roller 63. The main pole 75 forms a magnetic field with a developing-roller-side magnetic pole 63B provided in the developing roller 63, wherein in the magnetic field, they pull each other.

The developer container 60 is provided with a brush-clipping blade 65. The brush-clipping blade 65 extends along a longitudinal direction of the magnetic roller 62 (namely in the direction perpendicular to the plane of FIG. 3). The brush-clipping blade 65 is disposed on the upstream side of a position at which the developing roller 63 faces the magnetic roller 62, in the rotational direction of the magnetic roller 62 (see the arrow 92). There is a small gap (a short distance) between the edge of the brush-clipping blade 65 and the roller surface of the magnetic roller 62.

The regulation pole 76 is attached to the magnetic-roller-side magnetic pole 62B in the state where the magnetic pole face of the regulation pole 76 faces the brush-clipping blade 65. That is, the regulation pole 76 and the brush-clipping blade 65 are disposed to face each other. The brush-clipping blade 65 is made of, for example, a non-magnetic material or a magnetic material. Since the brush-clipping blade 65 faces the regulation pole 76 of the magnetic-roller-side magnetic pole 62B, a magnetic field is generated in a gap between the top edge of the brush-clipping blade 65 and the rotating sleeve 62A, wherein in the magnetic field, the regulation pole 76 and the brush-clipping blade 65 pull each other. With the presence of this magnetic field, the magnetic brush, which is composed of the toner and the magnetic carrier, is formed between the brush-clipping blade 65 and the rotating sleeve 62A.

The developing roller 63 includes a cylindrical developing sleeve 63A (an example of the roller main body of the present disclosure) and the developing-roller-side magnetic pole 63B. The developing sleeve 63A is rotatably supported by a frame (not shown) of the developing device 41.

Figure 4:
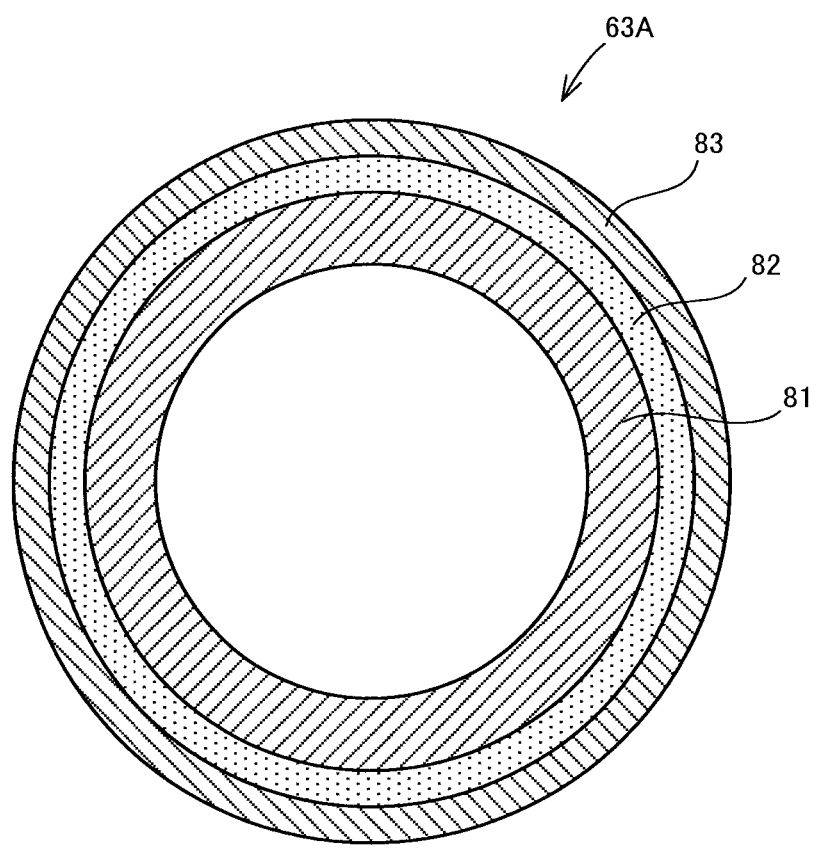
FIG. 4 is a cross sectional view showing the configuration of the developing sleeve of the developing roller included in the developing device.

As shown in FIG. 4, the developing sleeve 63A includes a cylindrical base body 81 which is a raw pipe made of aluminum, and the outer circumferential surface of the base body 81 is coated with an alumite layer 82. The alumite layer 82 is coated by the alumite treatment. The alumite treatment is also referred to as "anodic oxidation processing". In this treatment, the base body 81 of aluminum, as an electrode, is dipped into an electrolytic tank containing acidic aqueous solution of sulfuric acid or the like as the electrolytic bath (treatment bath). The electrolytic bath is electrolyzed by DC or AC, thereby an aluminum oxide coating film is formed on the surface of the base body 81. That is, the alumite layer 82 of the developing sleeve 63A is an aluminum oxide coating film formed on the surface of the base body 81. With this alumite treatment, it is possible to form an aluminum oxide coating film having a thickness of 5 to 100 μm on the surface of the base body 81. For example, sulfuric acid alumite, oxalic acid alumite, alumite that is obtained by using mixed organic acids and setting the electrolyte temperature to the normal temperature, or the like is applicable as the alumite layer 82.

The surface of the alumite layer 82 is coated with a resin coat layer 83 (an example of the resin coat layer of the present disclosure) which is made of a resin material and has electric conductivity. That is, in the developing sleeve 63A, the alumite layer 82 is formed on the outer circumferential surface of the base body 81, and the resin coat layer 83 is formed on the surface of the alumite layer 82. Nylon resin is used as the material of the resin coat layer 83. That is, the resin coat layer 83 is a coat layer made of nylon resin. More specifically, the resin coat layer 83 is formed from the nylon resin which includes titanium oxide in a dispersed state, wherein the titanium oxide has electric conductivity and is used as a conductive agent. In the present embodiment, titanium oxide with primary particle size of 15 nm to 30 nm is used. The resin coat layer 83 has electric conductivity since it contains the titanium oxide.

The resin coat layer 83 is formed on the surface of the alumite layer 82 as follows. A liquid mixture is generated by mixing a resin material and a conductive agent with a solvent such as methanol, and the liquid mixture is applied to the surface of the alumite layer 82. The applied liquid mixture is then dried, and the resin coat layer 83 is formed. During the process of drying the liquid mixture, the developing sleeve 63A is laid in a high-temperature environment (for example, from 90 to 130° C.). Alumite has a property of easily generating cracks when it is laid in a high-temperature environment due to a difference in thermal expansion coefficient from aluminum that is a raw material of alumite. As a result, during the process of drying the resin coat layer 83, a lot of small cracks are generated on the alumite layer 82 along the longitudinal direction of the developing sleeve 63A. In addition, during the process of drying the resin coat layer 83, a convection occurs in the solvent by the added heat due to the Benard cell phenomenon, and the convection moves the conductive agent. As the drying proceeds, the conductive agent is distributed unevenly in the thickness direction of the resin coat layer 83. Specifically, the conductive agent is distributed unevenly and more on the alumite layer 82 side, and may be distributed unevenly and more on the resin coat layer 83's surface side. Such a maldistribution may occur due to various factors such as the convection, the solvent drying speed in the drying process, the solvent moving speed when the solvent moves from inside toward the surface in the drying process, the specific gravity difference between the resin coat and titanium oxide, the affinity to the solvent, and the like. The maldistribution of the conductive agent causes uneven conductivity of the resin coat layer 83. In addition, conductive agent unevenly distributed more on the surface decreases the surface resistance, making it easy for a leak to occur. In addition, when cracks occur during the drying process, it becomes easy for conductive agent that is present more on the alumite layer 82 side by the maldistribution to enter the cracks. When large amounts of conductive agent enter the cracks, the resistance value of the alumite layer 82 is decreased, and it becomes more easy for a leak to occur.

In the present embodiment, by the coating process (alumite process), the surface of the base body 81 that is made of aluminum and is 12 mm to 20 mm in outer diameter is coated with the alumite layer 82 that is 10 μm in thickness. Subsequently, the resin coat layer 83 that is in the range from 2 μm to 9 μm in thickness is formed on the surface of the alumite layer 82 by the dipping method. The material of the resin coat layer 83 is produced by adding 50 to 150 pts.wt. of titanium oxide to 100 pts.wt. of nylon resin.

The developing sleeve 63A of the present embodiment is manufactured through the following processes. That is, the alumite layer 82 having a thickness of 10 μm is formed by allowing the outer circumferential surface of the base body 81 to be subjected to the alumite process. Subsequently, the surface of the base body 81, namely the surface of the alumite layer 82 is heated in a heating process at 120° C. for 10 minutes or longer. This heating process is performed to cause cracks to occur in advance before a drying process of the resin coat layer 83 is performed, thereby preventing cracks from occuring in the drying process. The time period for which the heating process is performed is determined in advance, and is set to be more than a time period for which the drying process is performed. The heating process is always performed at a predetermined temperature for a predetermined time period. This allows an approximately constant amount of cracks to occur to each base body 81 that is subjected to the heating process. After the heating process, a process for forming the resin coat layer 83 is executed. Specifically, in this process, nylon resin as the binding resin, titanium oxide as the conductive agent, and 800 pts.wt. of methanol as the dispersion medium are mixed together with zirconia beads of 1.0 mm in diameter for approximately 48 hours by a ball mill. In the mixed liquid, the base body 81 made of aluminum that has been subjected to the heating process is soaked and then taken out. The base body 81 is then dried in a high-temperature environment of 130° C. for 10 minutes. This completes manufacturing of the developing sleeve 63A coated with the resin coat layer 83 whose thickness is 2 to 9 μm.

As described above, the heating process is performed so that cracks occur to the alumite layer 82, and then the above-mentioned liquid mixture is adhered to the surface of the alumite layer 82. As a result, a part of the liquid mixture enters the cracks in the state where a convection due to the Benard cell phenomenon has not occurred in the liquid mixture, and a maldistribution of titanium oxide has not occurred. This prevents large amounts of titanium oxide from entering the cracks, and as a result, prevents the resistance value of the alumite layer 82 from decreasing. That is, appropriate insulation of the alumite layer 82 is maintained stably. This prevents leaks from occurring due to decrease of the resistance value even when the developing bias, which is described below, is applied to the developing sleeve 63A.

As shown in FIG. 3, the developing-roller-side magnetic pole 63B is included the developing sleeve 63A. That is, the developing-roller-side magnetic pole 63B is provided inside the developing sleeve 63A. The developing-roller-side magnetic pole 63B is composed of, for example, a permanent magnet that generates a magnetic force, and has a different polarity from the main pole 75. As a result, the developing-roller-side magnetic pole 63B and the main pole 75 form a magnetic field in which they pull each other.

A first bias circuit 71 (see FIG. 2) that applies a DC voltage (hereinafter referred to as "Vslv[DC]") and an AC voltage (hereinafter referred to as "Vslv[AC]"), is connected to the developing sleeve 63A of the developing roller 63. A second bias circuit 72 that applies a DC voltage (hereinafter referred to as "Vmag[DC]") and an AC voltage (hereinafter referred to as "Vmag[AC]"), is connected to the rotating sleeve 62A of the magnetic roller 62. The first bias circuit 71 and the second bias circuit 72 are grounded to the same ground. The first bias circuit 71 and the second bias circuit 72 superpose the DC voltage that is supplied from a DC power source (not shown), and the AC voltage that is supplied from an AC power source (not shown), and apply the superposed voltage.

A voltage varying device 73 (see FIG. 2) is connected to the first bias circuit 71 and the second bias circuit 72. The voltage varying device 73 can vary the Vslv[DC] and the Vslv[AC] to be applied to the developing roller 63, and vary the Vmag[DC] and the Vmag[AC] to be applied to the magnetic roller 62.

As described above, the developer is stirred by the first stirring screw 61A and the second stirring screw 61B while being circulated in the developer container 60, wherein the toner is charged and the developer is conveyed to the magnetic roller 62 by the second stirring screw 61B. The brush-clipping blade 65 is disposed to face the regulation pole 76 of the magnetic-roller-side magnetic pole 62B. As a result, the magnetic brush is formed between the brush-clipping blade 65 and the rotating sleeve 62A. The magnetic brush on the magnetic roller 62 is regulated in layer thickness by the brush-clipping blade 65, and as the rotating sleeve 62A rotates, the magnetic brush moves to a position at which it faces the developing roller 63. At this position, a magnetic field is imparted to the magnetic brush, wherein in this magnetic field, the main pole 75 of the magnetic-roller-side magnetic pole 62B and the developing-roller-side magnetic pole 63B pull each other. This causes the magnetic brush to be contacted with the roller surface of the developing roller 63. As a result, the toner having been adhered to the magnetic carrier of the magnetic brush is transferred to the developing roller 63. In addition, due to a potential difference ΔV between Vmag[DC] applied to the magnetic roller 62 and Vslv[DC] applied to the developing roller 63, a toner thin layer is formed on the roller surface of the developing roller 63. It is noted that the toner thin layer on the developing roller 63 varies in thickness as the potential difference ΔV is adjusted by the voltage varying device 73.

As the developing roller 63 rotates, the toner thin layer formed on the developing roller 63 via the magnetic brush is conveyed to a position where the photoconductor drum 11 and the developing roller 63 face each other. Since a voltage including an AC component has been applied to the developing sleeve 63A of the developing roller 63, toner flies toward the photoconductor drum 11 due to the potential difference (developing bias) between the developing roller 63 and the photoconductor drum 11. At this time, the toner reciprocates actively between the photoconductor drum 11 and the developing sleeve 63A due to an AC electric field formed by the AC voltage applied to the developing sleeve 63A. Toner that has reached the electrostatic latent image on the photoconductor drum 11 adheres to and develops the electrostatic latent image. On the other hand, toner reciprocating between the developing sleeve 63A and a non-image area other than the electrostatic latent image is returned to the developing sleeve 63A without adhering to the non-image area.

When the rotating sleeve 62A of the magnetic roller 62 further rotates clockwise, the magnetic brush is separated from the roller surface of the developing roller 63 due to a magnetic field in a horizontal direction (a circumferential direction of the roller) that is generated by the carrying pole 77 that is adjacent to the main pole 75 and has a different pole. As a result, toner that has remained without being used in the developing is collected from the developing roller 63 onto the rotating sleeve 62A. When the rotating sleeve 62A further rotates, a magnetic field is imparted, wherein in the magnetic field, the peeling pole 78 and the draw-up pole 79 of the magnetic-roller-side magnetic pole 62B, both having the same polarity, repel each other. This causes the toner to be separated from the rotating sleeve 62A in the developer container 60. The toner and the magnetic carrier are then stirred and conveyed by the second stirring screw 61B, drawn up again by the draw-up pole 79 and held on the rotating sleeve 62A as a two-component developer that has appropriate toner density and has been uniformly charged. The magnetic brush is then formed and conveyed to the brush-clipping blade 65.

Meanwhile, in the developing roller 63 used in the developing device 41, the titanium oxide contained in the resin coat layer 83 needs to be in a uniformly dispersed state. If the titanium oxide is dispersed ununiformly, a leak may occur or the developability may be decreased. For example, when titanium oxide is distributed unevenly and more on the surface of the resin coat layer 83, the resistance near the surface is decreased, and it becomes easy for a leak to occur. In addition, when titanium oxide is distributed unevenly and more on the alumite layer 82 side, titanium oxide on the surface side becomes less in amount, the adhesiveness of the toner on the surface of the developing roller 63 is decreased and it becomes easy for a toner fogging to occur.

In view of these, the inventors have made intensive studies and found, from the results of an experiment that is described below, a relationship between a resistance Rx and a resistance Ry that can be used to objectively evaluate the titanium oxide dispersion state, wherein Rx represents a surface resistance of the base body 81 in the state where the alumite layer 82 has been formed by the alumite process, and Ry represents a surface resistance of the developing sleeve 63A in which the resin coat layer 83 has been formed. In addition, the inventors succeeded in dispersing titanium oxide well by manufacturing the developing sleeve 63A to satisfy the above-mentioned relationship. Specifically, the inventors found that the titanium oxide dispersion state is favorable when $1.0 \times 10^{-3} \leq Ry/Rx \leq 16.8$ is satisfied as the above-mentioned relationship. In particular, the inventors found that the titanium oxide dispersion state is more favorable when $1.0 \leq Ry/Rx \leq 16.8$ is satisfied as the above-mentioned relationship.

Here, the surface resistance Rx of the alumite layer 82 and the surface resistance Ry of the resin coat layer 83 are measured by the following method. Specifically, point electrodes were connected to two points on the surface of each layer that were separated from each other by a predetermined length (for example, 10 mm) in the axis direction, and in that state, a DC voltage of 500 V was applied for ten seconds using a resistance measuring instrument (Hiresta UP MCP-HT450 measuring probe: Type UA made by Mitsubishi Chemical Analytech Co., Ltd.), and then the resistance was measured. It is noted that the measurement of the surface resistance Rx was performed on the base body 81 that was taken out in the state where the alumite layer 82 had been formed thereon, during the manufacturing process of the developing sleeve 63A.

The following describes, with reference to FIG. 5, the conditions that ensure a good titanium oxide dispersion state in the developing sleeve 63A. FIG. 5 is a table showing comparative examples 1 to 3 (CF1-3) and examples 1 to 16 (EX1-16) pertaining to the developing sleeve 63A. Specifically, a plurality of types of developing sleeve 63A that differ in the type of titanium oxide, content of titanium oxide, material of the resin coat layer, and thickness of the resin coat layer were prepared for each of the comparative examples and the examples. An experiment for measuring the resistances Rx and Ry was conducted on the comparative examples and examples, and values of resistance Rx, and values of the ratio of resistance Ry to resistance Rx (Ry/Rx) obtained from this experiment are shown in the table of FIG. 5 as the experiment results. In addition, in the present experiment, the surface roughness Ra of the developing sleeve 63A was measured for each of the comparative examples and the examples, and the measured values thereof are shown in FIG. 5. The surface roughness Ra was measured using a measurement apparatus "SURFCOM5000DX" made by TOKYO SEIMITSU CO., LTD. It is noted that the conductive agent used in the comparative examples 1 and 2 for the experiment was prepared by mixing carbon black with titanium oxide (ET300W made by Ishihara Sangyo Kaisha, Ltd.) having primary particle size of 30 nm. The conductive agent used in the comparative example 3 and examples 1 to 9 was titanium oxide (ET300W made by Ishihara Sangyo Kaisha, Ltd.) having primary particle size of 30 nm. In addition, the conductive agent used in the examples 10 to 16 was titanium oxide (SMT-A made by Tayca Corporation) having primary particle size of 15 nm.

Furthermore, the comparative examples and examples of the developing sleeve 63A shown in FIG. 5 were evaluated with regard to the variation in leak-generation voltages as follows. Specifically, the target of the experiment was the developing sleeve 63A, and an AC voltage was applied to the base body 81 of the developing sleeve 63A in the state where a drum member that was the same as the photoconductor drum 11 was disposed to face the developing sleeve 63A with a gap therebetween as in the actual developing. An ammeter for measuring a leak current was provided between the drum member and the ground, and the AC voltage was increased until a leak current was detected by the ammeter. The procedure of increasing the AC voltage until a leak current was detected was executed 10 times for each experiment target, and each applied voltage at the detection of the leak current was plotted. With regard to the variation in leak-generation voltages, it was evaluated as ○ (Good) when the variation width of the applied voltage that caused a leak current to flow was less than 10% of the average applied voltage, Δ (Fair) when the variation width was equal to or more than 10% and less than 15% of the average applied voltage, and x (Poor) when the variation width was equal to or more than 15% of the average applied voltage. Furthermore, an evaluation on the image density in a low-temperature low-humidity environment (LL environment) of temperature 10° C. and humidity 15% was performed as follows. Specifically, an image with a print rate of 1% was printed continuously on 1,000 print sheets of A4 size with an intermittent operation, and the image density of the solid part of all of the 1,000 print images was measured using Spectro-eye made by GretagMacbeth, and evaluated as ○ (Good) when the image density was equal to or more than 1.2, Δ (Fair) when the image density was less than 1.2 and equal to or more than 0.8, and x (Poor) when the image density was less than 0.8.

As shown in FIG. 5, the comparative examples 1 and 2 were evaluated as "poor" in variation in leak-generation voltages. In addition, the comparative example 3 was evaluated as "poor" in image density in the LL environment. On the other hand, the examples 1 to 16 were evaluated as "good" or "fair" in variation in leak-generation voltages, and evaluated as "good" in image density in the LL environment. As apparent from the table shown in FIG. 5, when the variation in leak-generation voltages is good or fair, the lowermost value of the resistance ratio Ry/Rx is $3.37 \times 10^{-3}$ (see example 9), and the uppermost value is 16.8 (see example 12). From these lowermost and uppermost values, it is determined that in the developing sleeve 63A, the variation in leak-generation voltages is good or fair and the image density in the LL environment is good when the resistance ratio Ry/Rx is equal to or higher than $1.0 \times 10^{-3}$ and equal to or lower than 16.8. In particular, since the lowermost value of the resistance ratio Ry/Rx is 1.0 (see example 10) when the variation in leak-generation voltages is good, it is understood that in the developing sleeve 63A, both the variation in leak-generation voltages and the image density in the LL environment are good when the resistance ratio Ry/Rx is equal to or higher than 1.0 and equal to or lower than 16.8.

It is noted that good or fair variation in leak-generation voltages means a good dispersion state of titanium oxide and a state where a leak is difficult to occur. This means that the resistance ratio Ry/Rx is effective as an index for objectively evaluating the level of the variation in leak-generation voltages and the titanium oxide dispersion state in the resin coat layer 83. As a result, by configuring the developing sleeve 63A such that the resistance ratio Ry/Rx is in the above-mentioned range, it is possible to realize the developing roller 63 in which the variation in leak-generation voltages is small and titanium oxide is dispersed well.

According to the above-described embodiment, as an example, the magnetic brush is used to form the toner layer on the developing sleeve 63A of the developing device 41. However, not limited to such a toner forming method, the present disclosure is applicable to other toner forming methods. In addition, the above-described embodiment explains, as an example, the developing device 41 that performs the developing by using a two-component developer. However, the present disclosure is applicable to developing devices and developing rollers that use a one-component developer whose main component is toner.

According to the above-described embodiment, as an example, the alumite layer 82 is formed in the developing sleeve 63A. However, the present disclosure is not limited to this. The present disclosure is applicable as far as, in the developing sleeve 63A, at least an aluminum oxide thin film is formed on the surface of the base body 81 of the developing sleeve 63A and the resin coat layer 83 is formed on the surface of the aluminum oxide thin film.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A developing roller comprising:
a roller main body disposed to face, without contact, an outer circumferential surface of an image carrier, wherein
the roller main body includes an aluminum oxide thin film and a resin coat layer, the aluminum oxide thin film being formed on an outer circumferential surface of a base body that is made of a metal including aluminum, the resin coat layer being formed on a surface of the aluminum oxide thin film that has been subjected to a predetermined heating process, the resin coat layer being made of a resin material and having electric conductivity, and
a ratio Ry/Rx is in a range from $1.0 \times 10^{-3}$ to 16.8, the Rx representing a surface resistance of the base body on which the aluminum oxide thin film has been formed, the Ry representing a surface resistance of the roller main body.

2. The developing roller according to claim 1, wherein the ratio Ry/Rx is in a range from 1.0 to 16.8.

3. The developing roller according to claim 1, wherein the aluminum oxide thin film is an alumite coating film formed by an anodic oxidation processing.

4. The developing roller according to claim 1, wherein an outer diameter of the roller main body is in a range from 12 mm to 20 mm.

5. A developing device comprising:
the developing roller according to claim 1; and
a magnetic roller configured to form a toner layer on a surface of the developing roller via a magnetic brush composed of toner and magnetic carrier.

6. An image forming apparatus comprising the developing device according to claim 5.

7. A developing roller comprising:
a roller main body disposed to face, without contact, an outer circumferential surface of an image carrier, wherein
the roller main body includes an aluminum oxide thin film and a resin coat layer, the aluminum oxide thin film being formed on an outer circumferential surface of a base body that is made of a metal including aluminum, the resin coat layer being formed on a surface of the aluminum oxide thin film that has been subjected to a predetermined heating process, the resin coat layer being made of a resin material and having electric conductivity, and
the resin coat layer is made of nylon resin that includes, as a conductive agent, titanium oxide with primary particle size of 15 nm to 30 nm, and 50 to 150 pts.wt. of the titanium oxide is included in 100 pts.wt. of the nylon resin.

8. A manufacturing method of a developing roller that includes a roller main body to be disposed to face, without contact, an outer circumferential surface of an image carrier, the manufacturing method comprising the steps of:
forming, by an anodic oxidation processing, an aluminum oxide thin film on an outer circumferential surface of a base body that is made of a metal including aluminum and constitutes a part of the roller main body;
performing a heating process on a surface of the aluminum oxide thin film; and
forming, by a dipping method, a resin coat layer on the surface of the aluminum oxide thin film after the heating process, the resin coat layer being made of a resin material and having electric conductivity, wherein
the steps are implemented such that a ratio Ry/Rx is in a range from $1.0 \times 10^{-3}$ to 16.8, the Rx representing a surface resistance of the base body on which the aluminum oxide thin film has been formed, the Ry representing a surface resistance of the roller main body.

* * * * *